(12) United States Patent
Zhang (10) Patent No.: US 9,805,662 B2
(45) Date of Patent: Oct. 31, 2017

(54) CONTENT ADAPTIVE BACKLIGHT POWER SAVING TECHNOLOGY

(71) Applicant: Intel Corporation, Santa Clara, CA (US)

(72) Inventor: Yanli Zhang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 14/665,352

(22) Filed: Mar. 23, 2015

(65) Prior Publication Data

US 2016/0284315 A1    Sep. 29, 2016

(51) Int. Cl.
 *G06T 1/00*    (2006.01)
 *G06T 15/00*   (2011.01)
 *G09G 3/34*    (2006.01)
 *G06F 3/147*   (2006.01)

(52) U.S. Cl.
 CPC ............... *G09G 3/34* (2013.01); *G06F 3/147* (2013.01); *G09G 3/3406* (2013.01); *G09G 2320/0247* (2013.01); *G09G 2320/0646* (2013.01); *G09G 2320/0653* (2013.01); *G09G 2320/103* (2013.01); *G09G 2330/021* (2013.01); *G09G 2360/16* (2013.01)

(58) Field of Classification Search
 CPC ............ G09G 5/10; G09G 5/003; G09G 3/34; G09G 3/147; G09G 3/3406; G09G 2320/0247; G09G 2320/0646; G09G 2320/0653; G09G 2320/103; G09G 2330/021; G09G 2360/16; G06F 3/147
 See application file for complete search history.

(56) References Cited

U.S. PATENT DOCUMENTS 4,792,979 A  *  12/1988  Nomura .................. G06T 5/009
                                              382/169
5,063,348 A  *  11/1991  Kuhara .............. G01R 33/3607
                                              324/307
5,224,177 A  *   6/1993  Doi ......................... G06T 5/007
                                              382/168

(Continued)

FOREIGN PATENT DOCUMENTS

KR    10-2012-0024829    3/2012

OTHER PUBLICATIONS

PCT Search Report and Written Opinion issued in corresponding PCT/US2016/018880 dated Aug. 24, 2016 (7 pages).

*Primary Examiner* — James A Thompson
*Assistant Examiner* — Charles L Beard
(74) *Attorney, Agent, or Firm* — Trop Pruner & Hu, P.C.

(57) ABSTRACT

A hybrid phase-in method mitigates the flicker and rolling artifact based on screen change detection or the combination of screen change detection and image spatial analysis. It applies, for example, to solutions that involve backlight and pixel modulation including global dimming and local dimming. If it is full screen change, then no phase-in is needed and the backlight and pixel change can be applied instantly. If it is partial screen change, then content type and spatial image analysis may be used to decide whether to use phase-in or not. The spatial image analysis concept provides additional useful information besides the image brightness analysis for display backlight power saving solutions to make better tradeoffs between power saving and visual quality.

15 Claims, 6 Drawing Sheets

(56) References Cited

U.S. PATENT DOCUMENTS

| | | | | |
|---|---|---|---|---|
| 5,307,182 A * | 4/1994 | Maltz | H04N 1/40006 | 358/504 |
| 5,414,538 A * | 5/1995 | Eschbach | H04N 1/4074 | 358/520 |
| 5,487,172 A * | 1/1996 | Hyatt | B60R 16/0373 | 700/8 |
| 5,544,258 A * | 8/1996 | Levien | G06T 5/009 | 358/448 |
| 5,561,811 A * | 10/1996 | Bier | G06F 3/038 | 710/5 |
| 5,576,731 A * | 11/1996 | Whitby | G09G 3/3629 | 345/100 |
| 5,630,037 A * | 5/1997 | Schindler | G06T 5/007 | 345/592 |
| 5,774,593 A * | 6/1998 | Zick | G06K 9/00711 | 375/E7.151 |
| 5,801,765 A * | 9/1998 | Gotoh | G11B 27/11 | 348/155 |
| 5,818,970 A * | 10/1998 | Ishikawa | H04N 1/40062 | 375/240.08 |
| 5,956,015 A * | 9/1999 | Hino | G09G 5/02 | 345/600 |
| 6,064,393 A * | 5/2000 | Lengyel | G06T 15/04 | 345/419 |
| 6,157,192 A * | 12/2000 | Cordes | G01R 33/56527 | 324/307 |
| 6,266,085 B1 * | 7/2001 | Kato | H04N 7/181 | 348/143 |
| 6,268,848 B1 * | 7/2001 | Eglit | G09G 5/008 | 345/204 |
| 6,297,801 B1 * | 10/2001 | Jiang | H04N 1/58 | 345/603 |
| 6,384,872 B1 * | 5/2002 | Tsui | H04N 7/0132 | 348/619 |
| 6,542,185 B1 * | 4/2003 | Bogardus | H04N 9/735 | 348/188 |
| 6,597,339 B1 * | 7/2003 | Ogawa | G09G 3/3406 | 345/102 |
| 6,664,973 B1 * | 12/2003 | Iwamoto | G06T 5/009 | 345/589 |
| 6,674,479 B2 * | 1/2004 | Cook | H04N 9/641 | 345/600 |
| 6,782,049 B1 * | 8/2004 | Dufaux | G06F 17/30802 | 348/700 |
| 6,816,289 B1 * | 11/2004 | Kim | G06T 7/90 | 358/515 |
| 7,034,791 B1 * | 4/2006 | Odom | G09G 5/14 | 345/100 |
| 7,119,786 B2 * | 10/2006 | Cui | G09G 3/3406 | 345/102 |
| 7,154,468 B2 * | 12/2006 | Linzmeier | G09G 3/3406 | 345/102 |
| 7,231,083 B1 * | 6/2007 | Cooper | G06F 1/3203 | 382/107 |
| 7,369,284 B1 * | 5/2008 | Inuzuka | H04N 9/045 | 348/E9.01 |
| 7,515,303 B2 * | 4/2009 | Hansen | H04N 1/403 | 358/3.13 |
| 7,839,418 B2 * | 11/2010 | Kwon | G09G 3/3607 | 345/589 |
| 8,111,949 B2 * | 2/2012 | Sakurai | G06T 3/0006 | 348/672 |
| 8,170,336 B2 * | 5/2012 | Kubota | H04N 1/38 | 382/168 |
| 8,223,113 B2 * | 7/2012 | Kerofsky | G09G 3/3413 | 345/102 |
| 8,260,043 B2 * | 9/2012 | Kubota | G06T 7/90 | 382/165 |
| 8,269,852 B2 * | 9/2012 | Shiraishi | H04N 5/2355 | 348/222.1 |
| 8,315,473 B1 * | 11/2012 | Tao | G06T 5/20 | 382/168 |
| 8,358,262 B2 * | 1/2013 | Degwekar | G09G 3/3406 | 345/102 |
| 8,441,538 B2 * | 5/2013 | Imagawa | H04N 5/144 | 348/208.13 |
| 8,508,621 B2 * | 8/2013 | Cote | H04N 19/80 | 348/222.1 |
| 8,531,379 B2 * | 9/2013 | Kerofsky | G09G 3/2007 | 345/102 |
| 8,531,542 B2 * | 9/2013 | Cote | H04N 9/68 | 348/222.1 |
| 8,577,141 B2 * | 11/2013 | Park | G06T 5/009 | 382/168 |
| 8,629,829 B2 * | 1/2014 | Chen | G09G 3/3406 | 345/102 |
| 8,629,913 B2 * | 1/2014 | Cote | H04N 5/335 | 348/222.1 |
| 8,639,024 B2 * | 1/2014 | Woodfill | G06K 9/32 | 348/46 |
| 8,643,770 B2 * | 2/2014 | Cote | H04N 5/2256 | 348/222.1 |
| 8,693,740 B1 * | 4/2014 | Sridhara | G06K 9/00288 | 382/115 |
| 8,699,043 B2 * | 4/2014 | Gotoh | H04N 1/00411 | 358/1.1 |
| 8,731,322 B2 * | 5/2014 | Lee | G06T 5/009 | 382/167 |
| 8,781,221 B2 * | 7/2014 | Ding | G06F 3/017 | 382/164 |
| 8,847,856 B2 * | 9/2014 | Nagahashi | G09G 5/22 | 345/56 |
| 8,922,704 B2 * | 12/2014 | Cote | 348/345 |
| 8,957,899 B2 * | 2/2015 | Takei | G06T 13/80 | 345/473 |
| 9,189,715 B2 * | 11/2015 | Masaru | G06K 15/1878 |
| 9,317,930 B2 * | 4/2016 | Kuo | G06T 7/408 |
| 9,378,689 B2 * | 6/2016 | Ahn | G09G 3/3607 |
| 9,396,693 B2 * | 7/2016 | Kuno | G09G 3/3696 |
| 9,449,375 B2 * | 9/2016 | Tsuda | G06T 5/40 |
| 9,489,361 B2 * | 11/2016 | Masuko | G06T 11/60 |
| 9,497,355 B2 * | 11/2016 | Hayasaki | H04N 1/4074 |
| 9,613,592 B2 * | 4/2017 | Kobayashi | G09G 5/10 |
| 9,619,873 B2 * | 4/2017 | Tsuda | G06T 5/40 |
| 9,666,119 B2 * | 5/2017 | Drzaic | G09G 3/30 |
| 2002/0003522 A1 * | 1/2002 | Baba | G09G 3/342 | 345/89 |
| 2002/0050965 A1 * | 5/2002 | Oda | G09G 3/3611 | 345/87 |
| 2002/0180744 A1 * | 12/2002 | Takala | G09G 5/393 | 345/545 |
| 2003/0001815 A1 * | 1/2003 | Cui | G09G 3/3406 | 345/102 |
| 2003/0058935 A1 * | 3/2003 | Lippincott | H04N 19/60 | 375/240.2 |
| 2004/0039277 A1 * | 2/2004 | Watanbe | A61B 5/055 | 600/410 |
| 2004/0113917 A1 * | 6/2004 | Matsumoto | G06T 7/004 | 345/589 |
| 2004/0215077 A1 * | 10/2004 | Witt | A61B 8/06 | 600/443 |
| 2005/0001033 A1 * | 1/2005 | Cheong | G06T 1/0021 | 235/454 |
| 2005/0140829 A1 * | 6/2005 | Uchida | H04N 5/142 | 348/625 |
| 2005/0184944 A1 * | 8/2005 | Miyata | G09G 3/3611 | 345/89 |
| 2005/0213125 A1 * | 9/2005 | Smith | G06T 5/009 | 358/1.9 |
| 2005/0275942 A1 * | 12/2005 | Hartkop | H04N 13/0409 | 359/464 |
| 2006/0007510 A1 * | 1/2006 | Nishide | H04N 1/603 | 358/518 |
| 2006/0050050 A1 * | 3/2006 | Zhou | G09G 3/344 | 345/107 |
| 2006/0092182 A1 * | 5/2006 | Diefenbaugh | G06F 1/3218 | 345/690 |

(56) References Cited

U.S. PATENT DOCUMENTS

| | | | |
|---|---|---|---|
| 2006/0139270 A1* | 6/2006 | Hong | G09G 3/3406 345/87 |
| 2006/0146003 A1* | 7/2006 | Diefenbaugh | G09G 3/3406 345/102 |
| 2006/0170791 A1* | 8/2006 | Porter | G06K 9/00295 348/231.3 |
| 2006/0198554 A1* | 9/2006 | Porter | G06K 9/00228 382/159 |
| 2006/0204121 A1* | 9/2006 | Bryll | G06K 9/6288 382/255 |
| 2006/0221046 A1* | 10/2006 | Sato | G09G 3/22 345/102 |
| 2006/0256240 A1* | 11/2006 | Oka | H04N 5/20 348/630 |
| 2006/0288291 A1* | 12/2006 | Lee | H04N 5/147 715/723 |
| 2007/0047809 A1* | 3/2007 | Sasaki | G06K 9/00791 382/170 |
| 2007/0081721 A1* | 4/2007 | Xiao | G06T 5/009 382/167 |
| 2007/0115366 A1* | 5/2007 | Tsubaki | G11B 27/034 348/220.1 |
| 2007/0139326 A1* | 6/2007 | Kwon | G09G 3/3607 345/88 |
| 2007/0206854 A1* | 9/2007 | Stahlke | G06T 5/009 382/168 |
| 2008/0068395 A1* | 3/2008 | Mori | G09G 3/2025 345/592 |
| 2008/0143978 A1* | 6/2008 | Damera-Venkata | G09G 3/002 353/94 |
| 2008/0144943 A1* | 6/2008 | Gokturk | G06F 17/3025 382/224 |
| 2008/0181492 A1* | 7/2008 | Abe | H04N 19/14 382/165 |
| 2008/0204396 A1* | 8/2008 | Otome | G09G 3/3648 345/102 |
| 2008/0211928 A1* | 9/2008 | Isomura | H04N 5/262 348/231.99 |
| 2008/0238856 A1* | 10/2008 | Bhowmik | G09G 3/3406 345/102 |
| 2008/0238861 A1* | 10/2008 | Honda | G09G 3/3406 345/102 |
| 2008/0316167 A1* | 12/2008 | Kurokawa | G09G 3/3406 345/102 |
| 2009/0027502 A1* | 1/2009 | Yang | G06F 3/012 348/169 |
| 2009/0033964 A1* | 2/2009 | Kubota | H04N 1/38 358/1.9 |
| 2009/0051771 A1* | 2/2009 | Kakita | G06F 17/30781 348/161 |
| 2009/0059078 A1* | 3/2009 | Kim | G09G 3/3406 348/645 |
| 2009/0067699 A1* | 3/2009 | Clark | A61B 8/08 382/131 |
| 2009/0110320 A1* | 4/2009 | Campbell | H04N 1/40062 382/260 |
| 2009/0116738 A1* | 5/2009 | Kubota | G06T 7/90 382/165 |
| 2009/0161172 A1* | 6/2009 | Mizutani | G06T 5/40 358/466 |
| 2009/0207182 A1* | 8/2009 | Takada | G09G 3/3406 345/589 |
| 2009/0219379 A1* | 9/2009 | Rossato | G06T 7/0083 348/14.01 |
| 2009/0237391 A1* | 9/2009 | Yanagi | G09G 5/18 345/213 |
| 2009/0303264 A1* | 12/2009 | Toshima | G09G 3/3406 345/690 |
| 2009/0322800 A1* | 12/2009 | Atkins | G09G 3/3413 345/690 |
| 2010/0066752 A1* | 3/2010 | Watanuki | G09G 3/3426 345/589 |
| 2010/0087730 A1* | 4/2010 | Yamada | A61B 5/055 600/419 |
| 2010/0123914 A1* | 5/2010 | Uwatoko | H04N 1/6094 358/1.9 |
| 2010/0201820 A1* | 8/2010 | Lopota | G06T 7/2053 348/152 |
| 2010/0227689 A1* | 9/2010 | Brunet de Courssou | G07F 17/32 463/37 |
| 2010/0227690 A1* | 9/2010 | Brunet De Courssou | G07F 17/32 463/42 |
| 2010/0245405 A1* | 9/2010 | Murai | G09G 3/3406 345/690 |
| 2010/0246947 A1* | 9/2010 | Ma | G06K 9/38 382/167 |
| 2010/0253611 A1* | 10/2010 | Takagi | G09G 3/3611 345/98 |
| 2010/0260413 A1* | 10/2010 | Yamazaki | G06T 5/009 382/164 |
| 2010/0277641 A1* | 11/2010 | Kato | G09G 3/3648 348/441 |
| 2010/0329559 A1* | 12/2010 | Shindo | G06T 5/40 382/172 |
| 2011/0001841 A1* | 1/2011 | Shiraishi | H04N 5/2355 348/223.1 |
| 2011/0007182 A1* | 1/2011 | Yamada | H04N 1/4074 348/224.1 |
| 2011/0013835 A1* | 1/2011 | Eguchi | G01B 11/28 382/168 |
| 2011/0033085 A1* | 2/2011 | Kubota | G01S 11/12 382/103 |
| 2011/0033086 A1* | 2/2011 | Kubota | H04N 5/23229 382/103 |
| 2011/0057961 A1* | 3/2011 | Tsuru | G09G 3/342 345/690 |
| 2011/0074800 A1* | 3/2011 | Stevens | G06T 11/40 345/545 |
| 2011/0099571 A1* | 4/2011 | Lucas | H04N 21/40 725/19 |
| 2011/0103700 A1* | 5/2011 | Haseyama | G06F 17/3025 382/225 |
| 2011/0128415 A1* | 6/2011 | Yokohata | H04N 5/232 348/239 |
| 2011/0141133 A1* | 6/2011 | Sankuratri | G06F 3/1454 345/600 |
| 2011/0145883 A1* | 6/2011 | Godar | H04N 5/445 725/131 |
| 2011/0157212 A1* | 6/2011 | Zhang | H04N 9/67 345/590 |
| 2011/0164816 A1* | 7/2011 | Guo | G06K 9/00241 382/165 |
| 2011/0205251 A1* | 8/2011 | Auld | H04N 13/0422 345/690 |
| 2011/0216372 A1* | 9/2011 | Adams | H04N 1/54 358/3.01 |
| 2011/0216967 A1* | 9/2011 | Hagiwara | G06T 7/0081 382/162 |
| 2011/0222767 A1* | 9/2011 | Mitsunaga | H04N 1/6027 382/169 |
| 2011/0242139 A1* | 10/2011 | Toshima | G09G 3/3406 345/690 |
| 2011/0262036 A1* | 10/2011 | Sannier | G06K 9/6212 382/164 |
| 2012/0041887 A1* | 2/2012 | Hurme | G06Q 10/08 705/318 |
| 2012/0050563 A1* | 3/2012 | Cote | H04N 5/235 348/223.1 |
| 2012/0081387 A1* | 4/2012 | Messmer | G09G 3/3426 345/591 |
| 2012/0081579 A1* | 4/2012 | Doepke | H04N 5/2355 348/231.99 |
| 2012/0120432 A1* | 5/2012 | Hirohata | H04N 1/00474 358/1.13 |
| 2012/0133733 A1* | 5/2012 | Sakaniwa | H04N 13/0025 348/43 |

(56) References Cited

U.S. PATENT DOCUMENTS

| | | | |
|---|---|---|---|
| 2012/0162159 A1 | 6/2012 | Kim | |
| 2012/0194570 A1* | 8/2012 | Muto | G09G 3/344 345/690 |
| 2012/0212598 A1* | 8/2012 | Mowrey | A61B 3/14 348/78 |
| 2012/0288197 A1* | 11/2012 | Adachi | G06T 7/001 382/167 |
| 2012/0327399 A1* | 12/2012 | Nagamine | G01J 3/462 356/73 |
| 2013/0021383 A1* | 1/2013 | Osawa | G06F 3/147 345/672 |
| 2013/0038704 A1* | 2/2013 | Hirata | G02B 27/2264 348/51 |
| 2013/0046175 A1* | 2/2013 | Sumi | A61B 8/08 600/431 |
| 2013/0071026 A1* | 3/2013 | Roux | G09G 5/02 382/167 |
| 2013/0093843 A1* | 4/2013 | Chun | H04N 13/00 348/42 |
| 2013/0114888 A1* | 5/2013 | Saito | G06T 5/003 382/159 |
| 2013/0116557 A1* | 5/2013 | Yoshikawa | A61B 8/06 600/431 |
| 2013/0120607 A1* | 5/2013 | Manabe | H04N 5/2355 348/223.1 |
| 2013/0121606 A1* | 5/2013 | Chien | G06T 5/005 382/260 |
| 2013/0129214 A1* | 5/2013 | Toda | H04N 1/407 382/167 |
| 2013/0187937 A1 | 7/2013 | Kerofsky | |
| 2013/0278614 A1 | 10/2013 | Sultenfuss | |
| 2013/0278830 A1* | 10/2013 | Noutoshi | G09G 5/02 348/607 |
| 2013/0285658 A1* | 10/2013 | Zhao | G01R 33/4828 324/309 |
| 2014/0071251 A1* | 3/2014 | Nakamura | G06F 3/0346 348/51 |
| 2014/0119650 A1* | 5/2014 | Zhou | H04N 1/6077 382/167 |
| 2014/0146089 A1* | 5/2014 | Kuno | G09G 3/3696 345/690 |
| 2014/0185104 A1* | 7/2014 | Hasegawa | H04N 1/38 358/452 |
| 2014/0219533 A1* | 8/2014 | Sato | A61B 5/055 382/131 |
| 2014/0267466 A1 | 9/2014 | Takagi | |
| 2014/0285477 A1* | 9/2014 | Cho | G09G 3/2003 345/207 |
| 2014/0286628 A1* | 9/2014 | Ando | H04N 9/793 386/282 |
| 2014/0292617 A1* | 10/2014 | Tejada Lacaci | G06F 3/1446 345/1.2 |
| 2014/0307007 A1* | 10/2014 | Cho | G09G 3/3406 345/690 |
| 2014/0307129 A1* | 10/2014 | Feng | H04N 5/2173 348/242 |
| 2014/0310304 A1* | 10/2014 | Bhardwaj | G06F 17/30277 707/769 |
| 2014/0361771 A1* | 12/2014 | Kamada | A61B 5/055 324/309 |
| 2015/0002559 A1* | 1/2015 | Fujine | G09G 3/3426 345/690 |
| 2015/0003749 A1* | 1/2015 | Kim | H04N 19/463 382/232 |
| 2015/0015460 A1* | 1/2015 | Kobayashi | G02B 27/017 345/8 |
| 2015/0015917 A1* | 1/2015 | Hirohata | H04N 1/00432 358/3.24 |
| 2015/0049122 A1* | 2/2015 | Buckley | G09G 3/2003 345/690 |
| 2015/0087902 A1* | 3/2015 | Mertz | G02B 21/14 600/109 |
| 2015/0109533 A1* | 4/2015 | Ikeda | H04N 9/3182 348/566 |
| 2015/0149000 A1* | 5/2015 | Rischmuller | B64C 39/024 701/7 |
| 2015/0169085 A1* | 6/2015 | Ida | G06F 3/005 345/156 |
| 2015/0181196 A1* | 6/2015 | Izawa | G03B 13/18 348/46 |
| 2015/0189180 A1* | 7/2015 | Sudo | H04N 5/23245 348/222.1 |
| 2015/0221097 A1* | 8/2015 | Yu | G06T 7/408 382/165 |
| 2015/0228090 A1* | 8/2015 | Okawa | G09G 5/02 345/604 |
| 2015/0245008 A1* | 8/2015 | Hyodo | H04N 13/0037 382/154 |
| 2015/0248775 A1* | 9/2015 | Freeman | G06T 11/001 345/589 |
| 2015/0253934 A1* | 9/2015 | Lin | G06F 3/0418 345/175 |
| 2015/0276905 A1* | 10/2015 | Murase | A61B 5/7203 324/322 |
| 2015/0287352 A1* | 10/2015 | Watanabe | G09G 3/20 345/89 |
| 2015/0310829 A1* | 10/2015 | Obara | G06F 3/00 345/589 |
| 2015/0313466 A1* | 11/2015 | Yoshida | A61B 5/0066 600/425 |
| 2015/0326752 A1* | 11/2015 | Hayasaki | H04N 1/4074 358/522 |
| 2015/0334398 A1* | 11/2015 | Socek | G06T 7/11 375/240.26 |
| 2015/0339757 A1* | 11/2015 | Aarabi | G06Q 30/06 705/12 |
| 2015/0339808 A1* | 11/2015 | Tsuda | G06T 5/40 382/167 |
| 2015/0356952 A1* | 12/2015 | Lee | G09G 5/10 345/589 |
| 2016/0014421 A1* | 1/2016 | Cote | H04N 19/196 382/170 |
| 2016/0065927 A1* | 3/2016 | Yamada | H04N 9/7933 386/304 |
| 2016/0086557 A1* | 3/2016 | Watanabe | G09G 3/3648 345/691 |
| 2016/0089097 A1* | 3/2016 | Ohishi | A61B 6/5235 378/62 |
| 2016/0089783 A1* | 3/2016 | Noh | G06K 9/00671 382/153 |
| 2016/0093239 A1* | 3/2016 | Wang | G06F 1/32 345/55 |
| 2016/0117975 A1* | 4/2016 | Kang | G09G 3/2003 345/694 |
| 2016/0125788 A1* | 5/2016 | Zhang | G09G 3/2044 345/596 |
| 2016/0127616 A1* | 5/2016 | Seshadrinathan | G06T 5/50 348/241 |
| 2016/0156851 A1* | 6/2016 | Yamada | H04N 1/40093 348/223.1 |
| 2016/0163059 A1* | 6/2016 | Xie | G06T 7/11 382/173 |
| 2016/0202460 A1* | 7/2016 | Zheng | H04N 5/2256 348/79 |
| 2016/0210908 A1* | 7/2016 | Seki | G09G 3/3406 |
| 2016/0259156 A1* | 9/2016 | Bifano | G02B 21/0028 |
| 2016/0322005 A1* | 11/2016 | Umeyama | G09G 3/3426 |
| 2016/0350913 A1* | 12/2016 | Nagae | G06T 7/0012 |
| 2016/0371808 A1* | 12/2016 | Croxford | G06T 1/20 |
| 2017/0053625 A1* | 2/2017 | Yu | G09G 5/10 |
| 2017/0061894 A1* | 3/2017 | Ikeda | G09G 5/003 |
| 2017/0062011 A1* | 3/2017 | Merrill | G11B 27/30 |
| 2017/0091575 A1* | 3/2017 | Lee | G06K 9/42 |
| 2017/0103730 A1* | 4/2017 | Yamazaki | G09G 5/10 |
| 2017/0116899 A1* | 4/2017 | Matsumoto | G09G 3/2003 |
| 2017/0132961 A1* | 5/2017 | Nagahashi | G09G 3/18 |
| 2017/0146340 A1* | 5/2017 | Yoon | G01B 11/272 |

\* cited by examiner

CONTENT ADAPTIVE BACKLIGHT POWER SAVING TECHNOLOGY

BACKGROUND

The display is a major power consumer on mobile platforms. Content adaptive backlight power saving technology saves display backlight power by dynamically dimming display backlighting and enhancing pixel brightness at the same time to achieve the same perceived brightness and image fidelity. The backlight dimming level depends on a pixel brightness analysis, which can be done through various methods, such as histogram analysis based on the V value in HSV color space. Image brightness changes cause backlight and pixel adjustment.

If the transition of backlight and pixel brightness is not properly implemented, then temporal artifacts such as flicker or rolling artifact will be observed. For example, if backlight and pixel brightness changes are not synchronized, then flicker will be observed.

However, even if the backlight and pixel change are well synchronized, if the change is applied instantly, then flicker will be observed in the unchanged area during partial screen update. An example of such a case is playing video in a big window (but not full screen) and the unchanged area is bright. If the backlight and pixel change are applied instantly, there will be flicker in the unchanged area.

Applying a small relative percentage change every frame for both backlight and pixel change can help mitigate the flicker issue. That is why gradual or progressive change over time, called phase-in, has been implemented in the display power saving technology.

BRIEF DESCRIPTION OF THE DRAWINGS

Some embodiments are described with respect to the following figures.

DETAILED DESCRIPTION

However, for images with a fine change gradient, phase-in could cause rolling artifacts during the phase-in period, due to the quantization error. The rolling artifact can be mitigated through dithering for a native 24-bit panel since dithering makes the panel behave like a 30-bit panel, mitigating quantization. However, for low bit depth panel such as 18-bit panel (6 bits per color), the rolling artifact cannot be well mitigated with dithering due to the limited bit depth. To avoid the rolling artifact, it is better to disable phase-in. However, today there is no mechanism available on the platform to differentiate gradient images from non-gradient images. In summary, the temporal artifact such as flicker and rolling happens in different scenarios when display backlight power saving type of technology is enabled.

A hybrid phase-in method mitigates the flicker and rolling artifact based on screen change detection or the combination of screen change detection and image spatial analysis. It applies, for example, to solutions that involve backlight and pixel modulation including global dimming and local dimming. If it is full screen change, then no phase-in is needed and the backlight and pixel change can be applied instantly. If it is partial screen change, then content type and spatial image analysis may be used to decide whether to use phase-in or not. The spatial image analysis concept provides additional useful information besides the image brightness analysis for display backlight power saving solutions to make better tradeoffs between power saving and visual quality.

Figure 1:
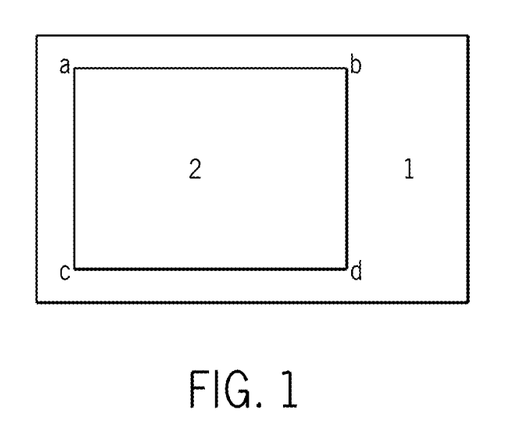
FIG. 1 is a depiction of a partial screen change according to one embodiment.

The detection of full screen and partial screen change can be done by graphics hardware or may be provided by an operating system (OS). The partial region change can be defined by the pixel positions of the four corners a, b, c, d of partial region 2 of screen 1, as shown in the FIG. 1.

If there is partial screen change, then whether to apply phase-in is further analyzed depending on the scene change rate in the partial screen window. If the scene change rate is fast, such as playing video in the partial screen, then phase-in mitigates the potential flicker issue in the unchanged area. If the scene change rate is slow such as viewing a static image in partial screen, then further spatial analysis is performed on the static image to decide whether to use phase-in or not in order to mitigate the potential rolling artifact on gradient images.

Existing technologies, such as Panel Self Refresh, detect screen change. If there is no screen change, then there will be no new data sent to panel. The display interface will be shut down, and panel goes to self refresh. There are mechanisms that can detect either full screen change or partial screen change. In the case of only a partial screen change, only the changed data are fetched from memory and sent over display interface to panel.

Figure 2:
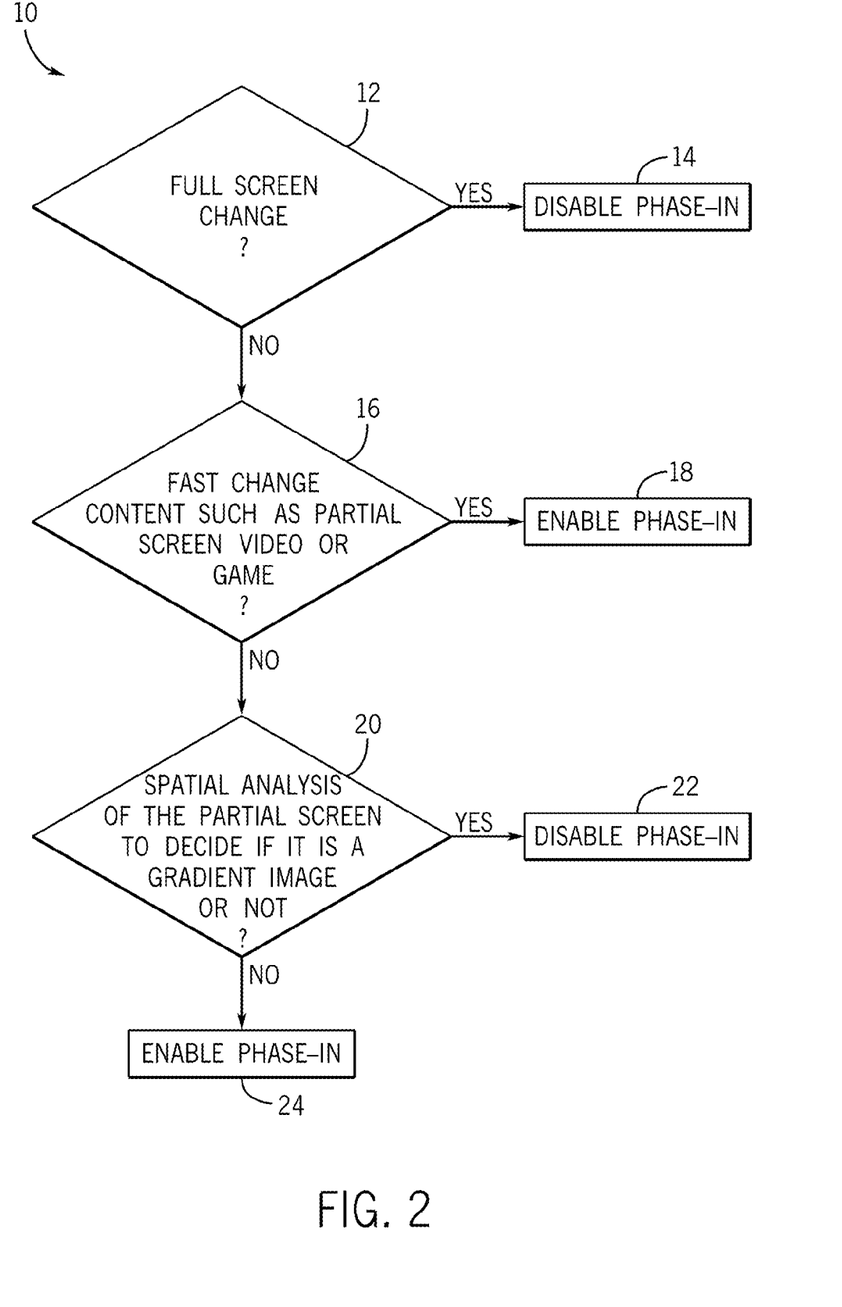
FIG. 2 is a flow chart for one embodiment.

One implementation is shown in FIG. 2. If the panel has high bit depth, 24-bit or above, then further spatial analysis might not be needed if dithering is enabled for the purpose of mitigating the rolling artifact and the implementation can be as shown in FIG. 2. However, the implementation in FIG. 2 does not exclude high bit depth panels.

The sequence 10 shown in FIG. 2 can be implemented in software, firmware, and/or hardware. In software and firmware embodiments it may be implemented by computer executed instructions stored in one or more non-transitory computer readable media such as magnetic, optical or semiconductor storage.

The sequence 10 begins by detecting whether there is a full screen change at diamond 12. This may be done in hardware or using the operating system. If it is a full screen change then phase-in is disabled as shown in block 14.

If there is a partial screen change, as determined in diamond 12, then a check at diamond 16 determines if there is fast change content such as partial screen video or video game. If so, phase-in may be enabled as indicated in block 18.

Otherwise, a check at diamond 20 determines whether spatial analysis of the partial screen indicates that it is a gradient image or not. If so, the phase-in is disabled as indicated in block 22 and otherwise phase-in is enabled as indicated in block 24.

Figure 3:
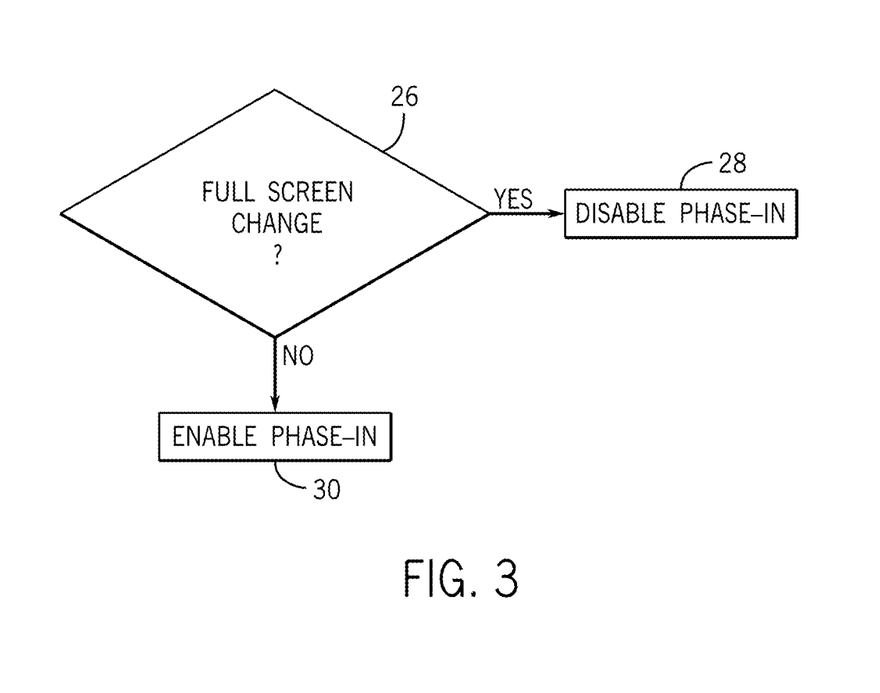
FIG. 3 is a flow chart for a 24-bit (and above) panel according to one embodiment.

FIG. 3 is a flow-chart on phase-in decision 24-bit panel and above with dithering enabled. If at diamond 26 there is a full screen change, phase-in is disabled at block 28.

If there is a partial screen change, then phase-in is enabled at block 30.

Image spatial information has been lacking in content adaptive backlight power saving solutions. Spatial information may be used in content adaptive backlight power saving solutions. Combined with brightness information that content adaptive backlight power saving solutions already have, a better tradeoff between power and visual quality can be made.

Figure 4:
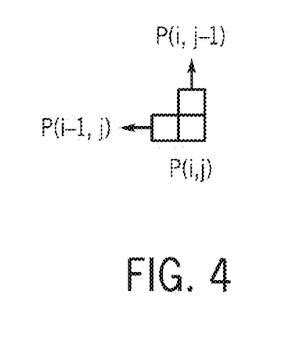
FIG. 4 is a screen shot showing a pixel and its two neighbors.

A spatial analysis method may be used to differentiate gradient images. A gradient image has smaller color value differences between adjacent pixels. The analysis is based on calculating the maximum difference of a pixel with its two neighboring pixels in both horizontal (left) (P(i−1, j)) and vertical direction (top) (P(i, j−1)) as shown in FIG. 4. The calculation can be based on Value in HSV color space or Luma Y in YUV color space or on sub-pixel values.

One example of pseudo code based on V is set forth below to explain how the maximum difference for each pixel besides the boundary pixels are calculated.

$$V(i,j) = \max(P(i,j)(R,G,B))$$

$$\text{Diff } L(i,j) = \text{abs}(V(i,j) - V(i-1,j))$$

$$\text{Diff } T(i,j) = \text{abs}(V(I,j) - V(i,j-1))$$

$$P\_\text{diff}(i,j) = \max(\text{Diff}\_L, \text{Diff}\_T)$$

Then a histogram based on the maximum difference of pixels with respect to their neighbors is built. If it is a gradient image then the majority of maximum differences is small and fall into low histogram bins. Therefore, whether it is a gradient image or not can be decided based on the percentage of low histogram bins. For example, a first threshold may be used to define low histogram bins and a second threshold can be used to assign a percentage above which it is decided that a high percentage of the pixels are in low histogram bins.

Figure 5:
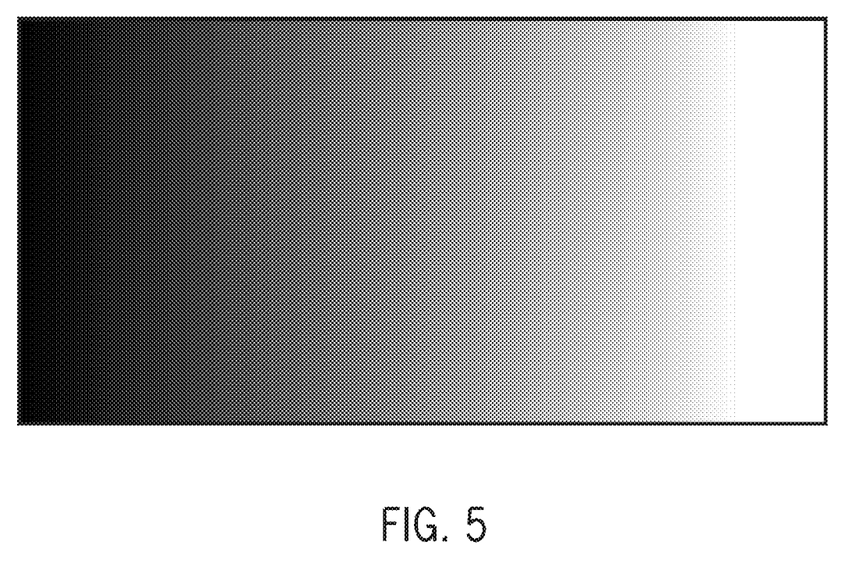
FIG. 5 is an example of gradient image.
Figure 6:
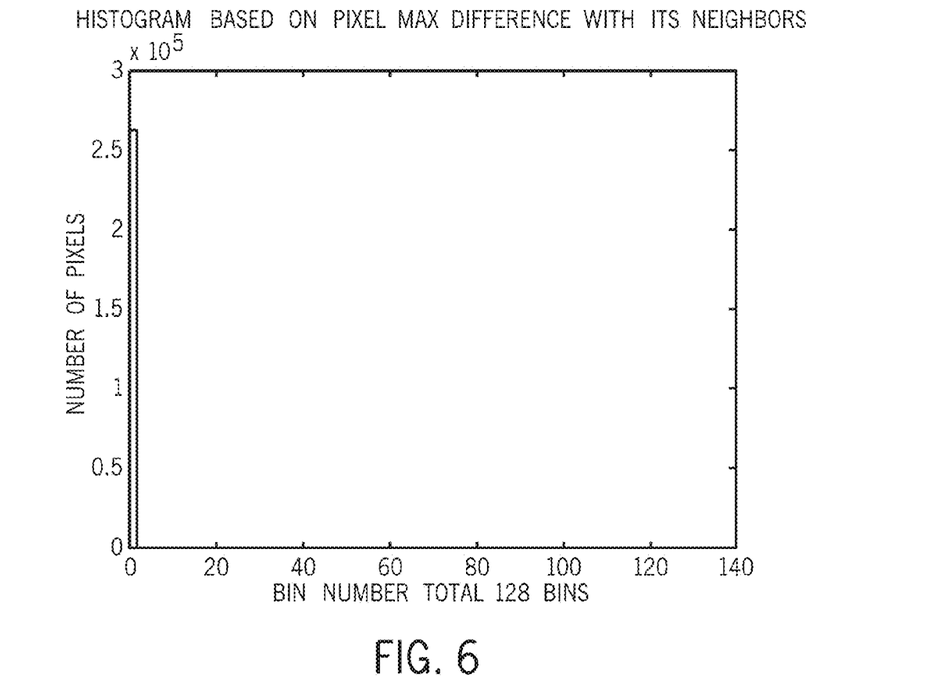
FIG. 6 is a histogram build based on the maximum difference for the gradient image of FIG. 5, according to one embodiment.

For example, for the gradient image in FIG. 5, the histogram based on maximum of pixel difference at a step of 2 is built and the result is shown in FIG. 6. It shows that most of the maximum difference falls into the lowest bin which holds value from 0 to 2. So this would be a gradient image.

Figure 7:
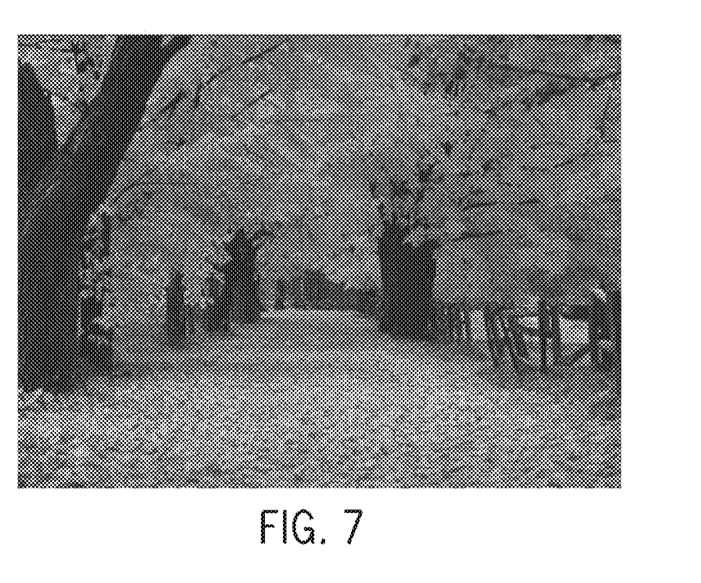
FIG. 7 is another example of a non-gradient image.
Figure 8:
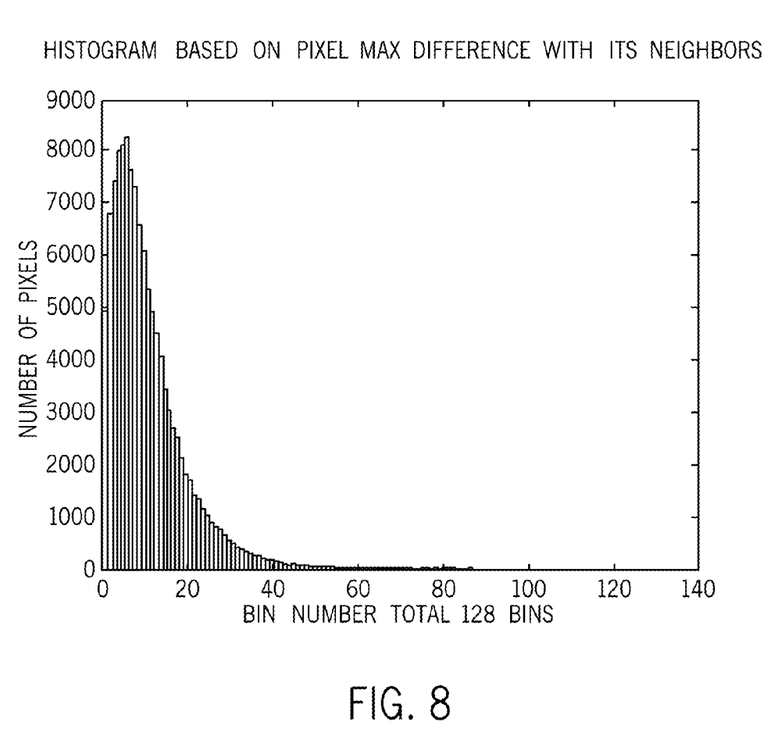
FIG. 8 is a histogram built for FIG. 7.

An example of a non-gradient image is shown in FIG. 7 and histogram based on maximum of pixel difference is shown in FIG. 8, which shows the percentage of pixels falling into the lowest bin is much lower than the gradient image example of FIGS. 5 and 6.

These are just examples. In real implementation, 128-bins might not be needed and how such a histogram is built is an implementation choice.

Combined with the histogram build based on image brightness, a gradient image can be differentiated from a uniform image. As stated previously, the spatial analysis serves as providing additional information for better power and image fidelity decisions. The backlight and pixel adjustment amount is mainly determined based on image brightness analysis, however, the spatial analysis can help fine tune that decision. Furthermore, the spatial analysis in not limited to full screen or partial screen. This concept can be applied to multi-region analysis to achieve better visual quality at the minimum cost of power saving loss.

Figure 9:
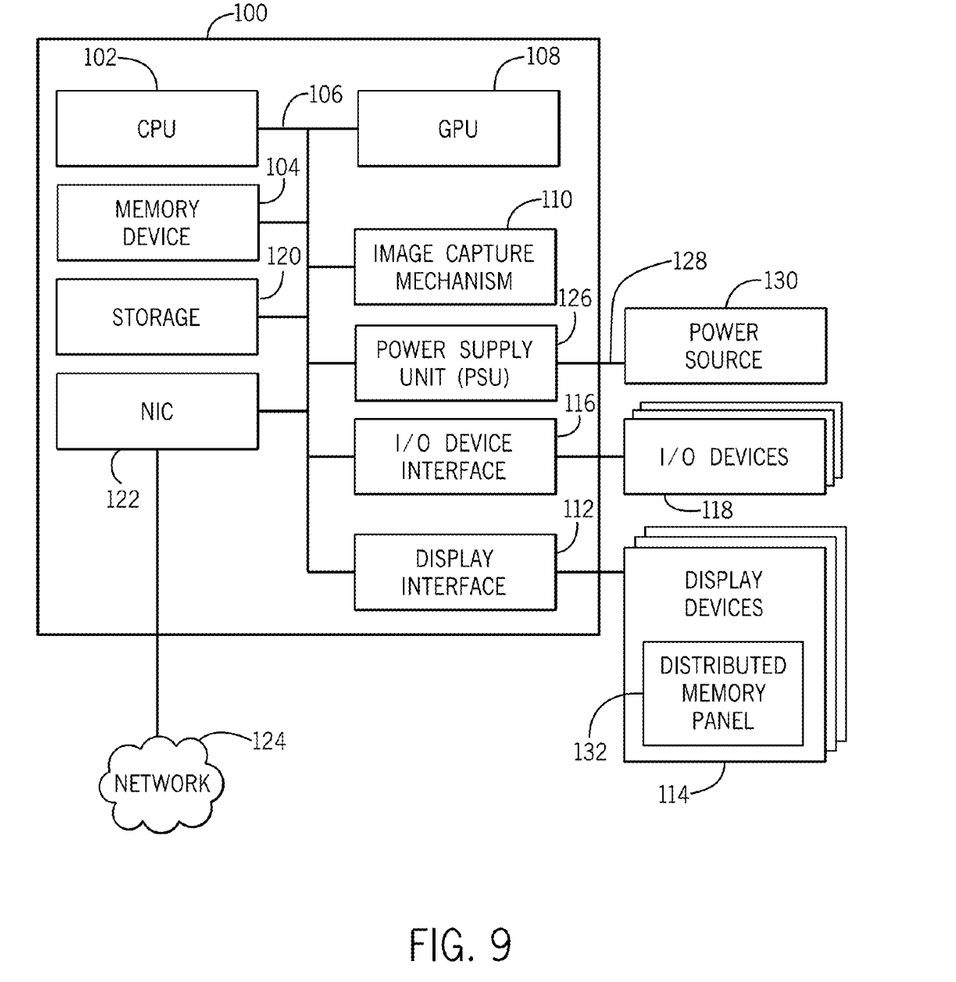
FIG. 9 is a system schematic for one embodiment.

FIG. 9 is a diagram illustrating an example of a computing device 100 to implement the techniques discussed herein. The computing device 100 may be, for example, a laptop computer, desktop computer, ultrabook, tablet computer, mobile device, or server, among others. The computing device 100 may include a central processing unit (CPU) 102 that is configured to execute stored instructions, as well as a memory device 104 that stores instructions that are executable by the CPU 102. For example, processor 102 may execute instructions to implement the sequences of FIGS. 2 and 3. The CPU may be coupled to the memory device 104 by a bus 106. Additionally, the CPU 102 can be a single core processor, a multi-core processor, a computing cluster, or any number of other configurations. Furthermore, the computing device 100 may include more than one CPU 102.

The computing device 100 may also include a graphics processing unit (GPU) 108. As shown, the CPU 102 may be coupled through the bus 106 to the GPU 108. The GPU 108 may be configured to perform any number of graphics functions and actions within the computing device 100. For example, the GPU 108 may be configured to render or manipulate graphics images, graphics frames, videos, or the like, to be displayed to a user of the computing device 100.

The memory device 104 can include random access memory (RAM), read only memory (ROM), flash memory, or any other suitable memory systems. For example, the memory device 104 may include dynamic random access memory (DRAM). The computing device 100 includes an image capture mechanism 110. In some examples, the image capture mechanism 110 is a camera, stereoscopic camera, scanner, infrared sensor, or the like.

The CPU 102 may be linked through the bus 106 to a display interface 112 configured to connect the computing device 100 to one or more display devices 114. The display device(s) 114 may include a display screen that is a built-in component of the computing device 100. Examples of such a computing device include mobile computing devices, such as cell phones, tablets, 2-in-1 computers, notebook computers or the like. The display devices 114 may also include a computer monitor, television, or projector, among others, that is externally connected to the computing device 100. In some cases, the display devices 114 may be head-mounted display devices having a display capacity via projection, digital display, filtering incoming light, and the like.

The CPU 102 may also be connected through the bus 106 to an input/output (I/O) device interface 116 configured to connect the computing device 100 to one or more I/O devices 118. The I/O devices 118 may include, for example, a keyboard and a pointing device, wherein the pointing device may include a touchpad or a touchscreen, among others. The I/O devices 118 may be built-in components of the computing device 100, or may be devices that are externally connected to the computing device 100. In some cases, the I/O devices 118 are touchscreen devices integrated within a display device, such as one or more of the display devices 114.

The computing device 100 may also include a storage device 120. The storage device 120 is a physical memory such as a hard drive, an optical drive, a thumbdrive, an array of drives, or any combinations thereof. The storage device 120 may also include remote storage drives. The computing device 100 may also include a network interface controller (NIC) 122 may be configured to connect the computing device 100 through the bus 106 to a network 124. The network 124 may be a wide area network (WAN), local area network (LAN), or the Internet, among others.

The computing device 100 and each of its components may be powered by a power supply unit (PSU) 126. The CPU 102 may be coupled to the PSU through the bus 106 which may communicate control signals or status signals between then CPU 102 and the PSU 126. The PSU 126 is further coupled through a power source connector 128 to a power source 130. The power source 130 provides electrical current to the PSU 126 through the power source connector 128. A power source connector can include conducting wires, plates or any other means of transmitting power from a power source to the PSU.

The computing device 100 may also include a distributed memory panel 132 located on the display devices 114 to distribute memory on a panel. In some examples, the distributed memory panel 132 may store image data to be displayed so that the computing device 100 does store them in a storage 120 or a memory device 104.

The block diagram of FIG. 9 is not intended to indicate that the computing device 100 is to include all of the components shown in FIG. 9. Further, the computing device 100 may include any number of additional components not shown in FIG. 9, depending on the details of the specific implementation.

The following clauses and/or examples pertain to further embodiments:

One example embodiment may be a method comprising determining whether there is a partial change of screen that affects less than all of a display screen, performing a spatial analysis of the partial screen change to decide if the partial screen is a gradient image and if so, disabling phase-in of the screen change and if not enabling phase-in of the screen change. The method may also include detecting fast changing content and enabling phase-in only if the content is changing quickly. The method may also include wherein performing spatial analysis includes calculating the maximum difference of a pixel with neighboring pixels. The method may also include wherein determining maximum difference includes determining the maximum difference in two directions. The method may also include determining the maximum difference based on the V component in an HSV color space. The method may also include determining the maximum difference based on the Y component in YUV color space. The method may also include building a histogram based on maximum difference of pixels versus their neighbors. The method may also include determining if a screen change is a gradient image depending on whether the majority of maximum differences fall into lower histogram bins.

Another example embodiment may be one or more non-transitory computer readable media storing instructions executed by a processor to perform a sequence comprising determining whether there is a partial change of screen that affects less than all of a display screen, performing a spatial analysis of the partial screen change to decide if the partial screen is a gradient image, and if so, disabling phase-in of the screen change and if not enabling phase-in of the screen change. The media may also include said sequence including detecting fast changing content and enabling phase-in only if the content is changing quickly. The media may also include said sequence wherein performing spatial analysis includes calculating the maximum difference of a pixel with neighboring pixels. The media may also include wherein determining maximum difference includes determining the maximum difference in two directions. The media may also include said sequence including determining the maximum difference based on the V component in an HSV color space. The media may also include said sequence including determining the maximum difference based on the Y component in YUV color space. The media may also include said sequence including building a histogram based on maximum difference of pixels versus their neighbors. The media may also include said sequence including determining if a screen change is a gradient image depending on whether the majority of maximum differences fall into lower histogram bins.

In another example embodiment an apparatus comprising a processor to determine whether there is a partial change of screen that affects less than all of a display screen, perform a spatial analysis of the partial screen change to decide if the partial screen is a gradient image, and if so, disable phase-in of the screen change and if not enabling phase-in of the screen change; and a storage coupled to said processor. The apparatus may include said processor to detect fast changing content and enabling phase-in only if the content is changing quickly. The apparatus may include said processor calculate the maximum difference of a pixel with neighboring pixels. The apparatus may include said processor to determine the maximum difference in two directions. The apparatus may include said processor to determine the maximum difference based on the V component in an HSV color space. The apparatus may include said processor to determine the maximum difference based on the Y component in YUV color space. The apparatus may include said processor to build a histogram based on maximum difference of pixels versus their neighbors. The apparatus may include said processor to determine if a screen change is a gradient image depending on whether the majority of maximum differences fall into lower histogram bins.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   determining whether there is a partial change of screen that affects less than all of a display screen;
   building a histogram based on maximum difference of pixels versus their neighbors;
   performing a spatial analysis of the partial screen change to decide if the partial screen is a gradient image that involves first color change values smaller than second color change values, including determining if a screen change is a gradient image depending on whether a majority of maximum differences in color values being smaller falling into lower histogram bins; and
   if so, disabling phase-in of the screen change and if the spatial analysis indicates that the partial screen involves the second color change values larger than said first color change values, enabling phase-in of the screen change.

2. The method of claim 1 including detecting fast changing content and enabling phase-in only if the content is changing quickly.

3. The method of claim 1 wherein determining maximum difference includes determining the maximum difference in two directions.

4. The method of claim 3 including determining the maximum difference based on a V component in an HSV color space.

5. The method of claim 3 including determining the maximum difference based on the Y component in YUV color space.

6. One or more non-transitory computer readable media storing instructions executed by a processor to perform a sequence comprising:
    determining whether there is a partial change of screen that affects less than all of a display screen;
    building a histogram based on maximum difference of pixels versus their neighbors;
    performing a spatial analysis of the partial screen change to decide if the partial screen is a gradient image that involves first color change values smaller than second color change values, including determining if a screen change is a gradient image depending on whether a majority of maximum differences in color values being smaller falling into lower histogram bins; and
    if so, disabling phase-in of the screen change and if the spatial analysis indicates that the partial screen involves the second color change values larger than said first color change values, enabling phase-in of the screen change.

7. The media of claim 6, said sequence including detecting fast changing content and enabling phase-in only if the content is changing quickly.

8. The media of claim 6 wherein determining maximum difference includes determining the maximum difference in two directions.

9. The media of claim 8, said sequence including determining the maximum difference based on a V component in an HSV color space.

10. The media of claim 8, said sequence including determining the maximum difference based on the Y component in YUV color space.

11. An apparatus comprising:
    a processor to determine whether there is a partial change of screen that affects less than all of a display screen, build a histogram based on maximum difference of pixels versus their neighbors, perform a spatial analysis of the partial screen change to decide if the partial screen is a gradient image that involves first color change values smaller than second color change values, wherein performing, including determining if a screen change is a gradient image depending on whether a majority of maximum differences in color values being smaller falling into lower histogram bins, and if so, disable phase-in of the screen change and if the spatial analysis indicates that the partial screen involves the second color change values larger than said first color change values, enabling phase-in of the screen change; and
    a storage coupled to said processor.

12. The apparatus of claim 11, said processor to detect fast changing content and enabling phase-in only if the content is changing quickly.

13. The apparatus of claim 11, said processor to determine the maximum difference in two directions.

14. The apparatus of claim 13, said processor to determine the maximum difference based on a V component in an HSV color space.

15. The apparatus of claim 13, said processor to determine the maximum difference based on the Y component in YUV color space.

* * * * *